(12) United States Patent
Branch et al.

(10) Patent No.: US 8,509,816 B2
(45) Date of Patent: Aug. 13, 2013

(54) DATA PRE-FETCHING BASED ON USER DEMOGRAPHICS

(75) Inventors: Joel W. Branch, Hamden, CT (US); Han Chen, White Plains, NY (US); Hui Lei, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/294,540

(22) Filed: Nov. 11, 2011

(65) Prior Publication Data

US 2013/0122934 A1    May 16, 2013

(51) Int. Cl.
*H04W 24/00* (2009.01)
(52) U.S. Cl.
USPC ......... 455/456.3; 455/404.2; 455/456.1; 455/456.2; 455/456.6; 455/414.1; 455/414.2; 455/457
(58) Field of Classification Search
USPC ......... 455/404.2, 456.1, 456.2, 456.6, 414.1, 455/414.2, 457
See application file for complete search history.

(56) References Cited

U.S. PATENT DOCUMENTS

| | | | |
|---|---|---|---|
| 6,571,279 B1 | 5/2003 | Herz et al. | |
| 6,871,236 B2 | 3/2005 | Fishman et al. | |
| 7,363,291 B1 | 4/2008 | Page | |
| 7,668,536 B2 | 2/2010 | Hull et al. | |
| 2004/0162830 A1 | 8/2004 | Shirwadkar et al. | |
| 2005/0033829 A1 | 2/2005 | Oommen | |
| 2006/0212353 A1 | 9/2006 | Roslov et al. | |
| 2006/0270419 A1* | 11/2006 | Crowley et al. | 455/456.2 |
| 2007/0155307 A1 | 7/2007 | Ng et al. | |
| 2008/0034088 A1 | 2/2008 | Suresh | |
| 2008/0059282 A1 | 3/2008 | Vallier et al. | |
| 2008/0086368 A1 | 4/2008 | Bauman et al. | |
| 2008/0242279 A1* | 10/2008 | Ramer et al. | 455/414.2 |
| 2008/0287150 A1* | 11/2008 | Jiang et al. | 455/466 |
| 2009/0018918 A1 | 1/2009 | Moneypenny et al. | |
| 2009/0181649 A1 | 7/2009 | Bull et al. | |
| 2009/0192928 A1 | 7/2009 | Abifaker | |
| 2009/0287750 A1 | 11/2009 | Banavar et al. | |
| 2009/0298514 A1* | 12/2009 | Ullah | 455/456.5 |
| 2009/0326810 A1* | 12/2009 | Callaghan et al. | 701/208 |
| 2009/0327390 A1 | 12/2009 | Tran et al. | |
| 2010/0076850 A1 | 3/2010 | Parekh et al. | |
| 2010/0088614 A1 | 4/2010 | Barbieri et al. | |

(Continued)

OTHER PUBLICATIONS

"Alterian SM2", Alterian, http://www.alterian.com/socialmedia/, accessed on Nov. 10, 2011, 2 pages.

(Continued)

*Primary Examiner* — Kamran Afshar
*Assistant Examiner* — Khalid Shaheed
(74) *Attorney, Agent, or Firm* — Francis Lammes; Stephen J. Walder, Jr.; Preston J. Young

(57) ABSTRACT

Mechanisms are provided for pre-fetching content data and storing the content data in a mobile device. An identifier of a mobile device and a location of the mobile device are received. Demographic information about a user of the mobile device is obtained based on the identifier of the mobile device. The demographic information of the user is compared with demographic information of other users to identify one or more similar users having similar demographic information to the demographic information of the user of the mobile device. Content data to transmit to the mobile device is identified based on the location of the mobile device and the identification of the one or more similar users. The content data is transmitted to the mobile device for storage in the mobile device.

23 Claims, 9 Drawing Sheets

(56) References Cited

U.S. PATENT DOCUMENTS

2010/0164947 A1 7/2010 Bolger et al.
2010/0241663 A1 9/2010 Huang et al.
2011/0065424 A1 3/2011 Estevez et al.
2011/0078279 A1 3/2011 Grecco et al.
2011/0213762 A1 9/2011 Sherrets et al.

OTHER PUBLICATIONS

Kim, Soo-Min et al., "Determining the Sentiment of Opinions", Proceedings of the Intl. Conference on Computational Lingiuistics (COLING), 2004, pp. 1-8.

Pang, Bo et al., "Thumbs up? Sentiment Classification using Machine Learning Techniques", EMNLP 2002, 8 pages.

Turney, Peter D., "Thumbs Up or Thumbs Down? Semantic Orientation Applied to Unsupervised Classification of Reviews", Proceedings of the 40th Annual Meeting of the Association for Computational Linguistics (ACL), Jul. 2002, pp. 417-424.

Yu, Hong et al., "Towards Answering Opinion Questions: Separating Facts from Opinions and Identifying the Polarity of Opinion Sentences", EMNLP, 2003, 8 pages.

International Search Report and Written Opinion dated Feb. 1, 2013 for International Application No. PCT/US2012/063679, 14 pages.

\* cited by examiner

DATA PRE-FETCHING BASED ON USER DEMOGRAPHICS

BACKGROUND

The present application relates generally to an improved data processing apparatus and method and more specifically to mechanisms for performing data pre-fetching based on user demographics.

Mobile Internet usage has spiked in recent years as smartphones, tablet computers, and other mobile devices have become mainstream computing and communication devices. As opposed to using such devices for voice communication and exchanging voice messages, the dominant usage trend is the use of mobile devices to access web sites and rich media, e.g., television programs, movies, and music, via Internet data connections. Various mobile applications, or "apps," may be utilized to access such content. Furthermore, a growing number of users are accessing media content as a result of scanning barcodes (e.g., Quick Response (QR) or Microsoft tags in printed advertisements or billboards) and/or capturing images (e.g., using Google Goggles™) with their mobile devices to learn more about products and locations.

All of these trends are leading to increased congestion on mobile networks. This reduces network performance and, in turn, reduces the quality of the user experience in consuming media via mobile devices. As a result, data caching mechanisms have been developed where copies of frequently accessed files are stored physically close to the point of usage. Examples of such data caching mechanisms may be found in U.S. Pat. No. 6,871,236 and U.S. Patent Application Publication Nos. 2009/0326810 and 2010/0088614.

SUMMARY

In one illustrative embodiment, a method, in a data processing system, is provided for pre-fetching content data and storing the content data in a mobile device. The method comprises receiving, in the data processing system from the mobile device, an identifier of the mobile device and a location of the mobile device. Moreover, the method comprises obtaining, by the data processing system, demographic information about a user of the mobile device based on the identifier of the mobile device. In addition, the method comprises comparing, by the data processing system, the demographic information of the user with demographic information of other users to identify one or more similar users having similar demographic information to the demographic information of the user of the mobile device. Furthermore, the method comprises identifying, by the data processing system, content data to transmit to the mobile device based on the location of the mobile device and the identification of the one or more similar users. In addition the method comprises transmitting, by the data processing system, the content data to the mobile device for storage in the mobile device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
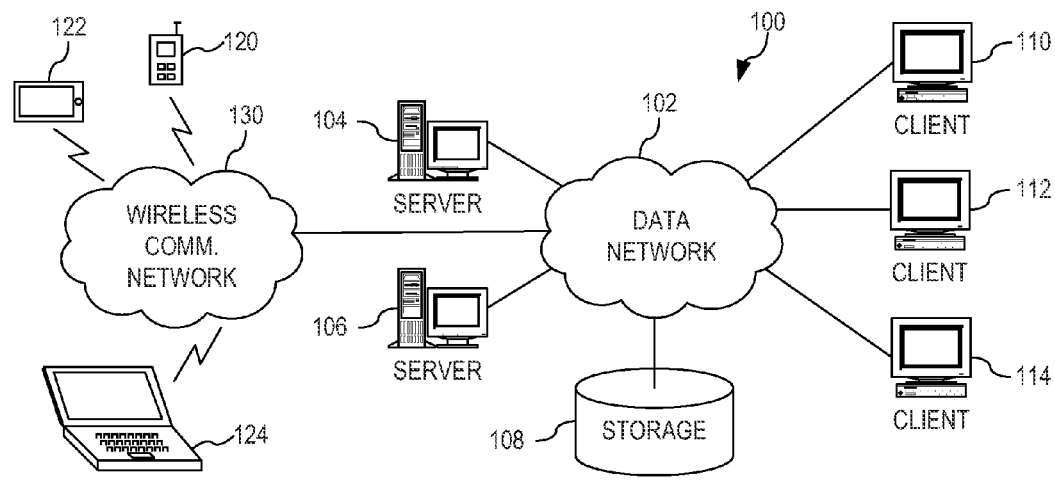
FIG. 1 depicts a pictorial representation of an example distributed data processing system in which aspects of the illustrative embodiments may be implemented.

The illustrative embodiments provide a mechanism for data pre-fetching based on mobile user demographics. The mechanisms of the illustrative embodiments pro-actively and automatically download web page content, media, applications, and other data network available files to mobile computing/communication devices, e.g., smartphones, tablet computers, and the like, based on a number of factors: (1) a mobile device user's current or predicted location; (2) the physical location associated with the content/application of potential interest; (3) the user's demographic likeness to other users who have accessed the content/application, including the user of social-network characteristics; (4) the status, availability, and/or preferences of suitable (e.g., faster, cheaper, free) wireless networks for transmitting the data.

For example, consider the following scenario. A smartphone user heads to an automobile show to meet a group of friends. The user's friends are members of his electronic social network and have been taking and posting photos of certain cars and also interacting with QR tags that link smartphone users to informative applications and media associated with various vehicles. It is known that the user usually experiences poor data connections in the vicinity of the automobile show.

The illustrative embodiments described herein predicts that the user is approaching the automobile show via location tracking and monitoring interaction with his friends at the automobile show. The demographics of the user as compared with other users in a same location of the automobile show, and possibly filtered to include only the users in a same social network as the present user, may be used to further identify the most pertinent information which the present user may be interested in. Hence, the media and applications that are most likely to be accessed by the user at the show, as indicated by the activity of his friends reflected in the social network, are pre-fetched and cached in the user's mobile device before reaching zones of low connectivity. This media is location and temporally dependent. Media pertaining to other QR tags is not cached. The information that is pre-fetched and cached, in one illustrative embodiment, may be stored in the mobile device in a manner where the information is not accessible by the user until he scans the associated QR tag, or performs a requisite operation for retrieving the information, thereby aligning the mechanisms of the illustrative embodiments with specific marketing models. Of course, this is not required and instead, the information may be made available to the user via his mobile device prior to performing any such action or operation. Thus, the information that is downloaded to the mobile device is automatically identified and downloaded based on a physical location of the user's mobile device, a physical location associated with the content/application of potential interest, the user's demographics, and the status, availability, and/or preferences of suitable (e.g., faster, cheaper, free) wireless networks for transmitting the data.

As mentioned above, mechanisms have been developed for caching frequently accessed files at computing devices that are physically located close to the points of usage. However, the main drawback of such caching solutions is that these solutions only consider a user's location or explicit information preference. These caching solutions completely ignore a vast range of a user's "social" information which is now often associated with the usage of the mobile devices and services. Also, most caching solutions focus on storing content of interest somewhere in the network, e.g., at an edge server. However, this is not adequate for scenarios where mobile connectivity to the network is poor.

The illustrative embodiments reduce location dependent network congestion by utilizing user demographic information, real-time social network activity, location information, and network condition information to pre-fetch information to a mobile device. This caching technique is more personally tailored than other caching solutions. Moreover, the illustrative embodiments improve the services of businesses (e.g., marketers, advertisers, sellers, and the like) that attempt to use mobile networks to delivery location dependent information.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
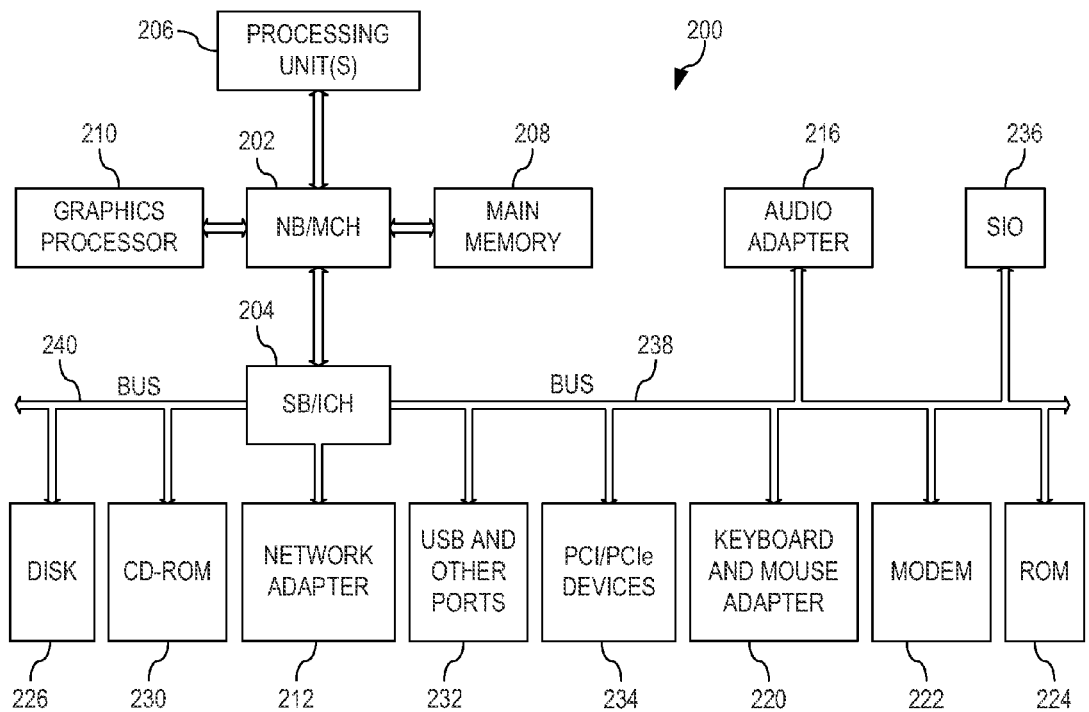
FIG. 2 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. Moreover, the servers 104, 106 may be in communication with mobile devices 120, 122, and 124 via the network 102 and one or more wireless communication networks 130. The mobile devices 120, 122, and 124 may be any type of mobile communication/computing device presently known or later developed. For example, the mobile devices 120, 122, and 124 may be tablet computers, mobile telephones, smartphones, laptop computers, or the like. The wireless communication networks 130 may be cellular networks, wireless data networks, or the like, such as a wireless 3G or 4G data network, for example.

In the depicted example, server 104 provides data, such as boot files, operating system images, applications, media content, media files, facilitate various types of data-based communications including electronic mail, instant messaging, voice over IP (VOIP) communications, and/or the like, to the clients 110, 112, and 114 and/or mobile devices 120, 122, and 124. Clients 110, 112, and 114, and mobile devices 120, 122, and 124, are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is intended to illustrate a general data processing system in which various aspects of the illustrative embodiments may be implemented and as such, may represent any of a number of different types of computing devices. For example, data processing system 200 may be an example of a server computer, such as client 106 in FIG. 1, in which computer usable code or instructions implementing the processes for illustrative embodiments of the present invention may be located. The data processing system in FIG. 2 may further be implemented as part of a mobile device, such as mobile device 120, such that the mobile device 120 is capable of performing computing operations including processing and outputting media content, executing applications, processing data files, and the like. Data processing system 200 likewise may be a client computing system, such as client 110 in FIG. 1, for example.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

As mentioned above, it should be noted that the data processing system 200 may take the form of any of a number of different types of data processing systems including client computing devices, server computing devices, a tablet computer, laptop computer, mobile telephone (smartphone) or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As discussed above, the illustrative embodiments provide mechanisms for pre-fetching information, content, data, or the like, and transmitting the data to a mobile device based on a location or predicted location of the mobile device, information, content, or data to be distributed to mobile devices which are associated with the location or predicted location, demographics of the user of the mobile device, demographics of target recipients of the information, content or data, demographics of users in the same or similar social network groups as the user of the mobile device, communication network congestion and preferences, etc. As such, aspects of the illustrative embodiments may be implemented in a server computing device to facilitate the pre-fetching and pushing of information, content, data, or the like, to mobile devices based on these criteria. Other aspects of the illustrative embodiments may be implemented in the mobile devices themselves for storing the pushed information, content, data or the like in a manner where it is either immediately accessible to the user, or not accessible until the user performs corresponding access operations to access the data, such operations possibly being dependent upon the location of the mobile device or predicted Location of the mobile device.

Figure 3:
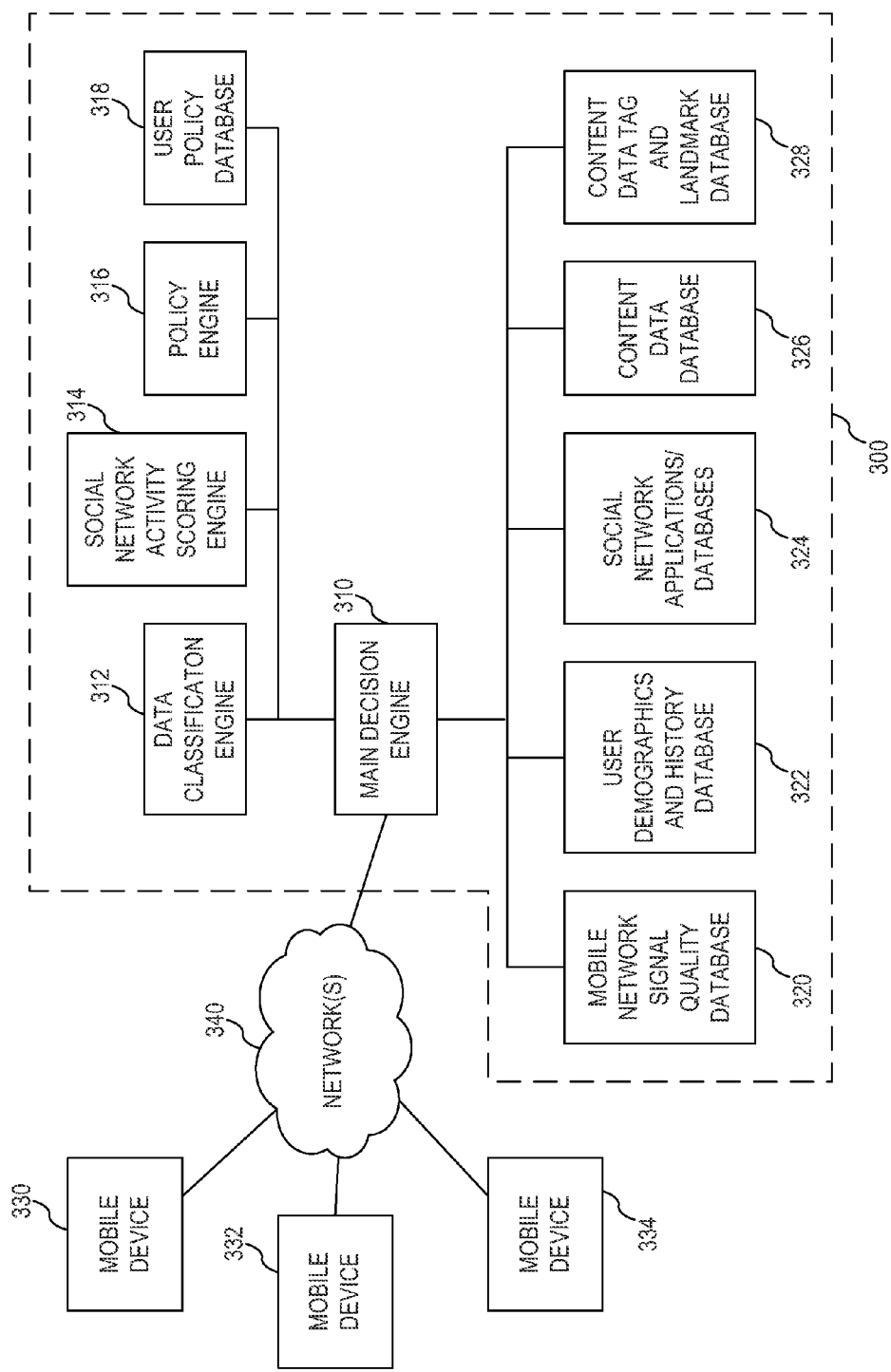
FIG. 3 is an example block diagram of server computing device and its primary operational elements for implementing aspects of one illustrative embodiment.

FIG. 3 is an example block diagram of server computing device and its primary operational elements for implementing aspects of one illustrative embodiment. As shown in FIG. 3, the server computing device 300 includes a main decision engine 310, a data classification engine 312, a social network activity scoring engine 314, a policy engine 316, a user policy database 318, a mobile network signal quality database 320, a user demographics and history database 322, social network applications/databases 324, content data database 326, and content data tag and landmark database 328. The server 300 is coupled to one or more mobile devices 330-334 via one or more networks 340 which may include one or more wireless communication networks and one or more data networks (wired and/or wireless).

The main decision engine 310 performs the primary decisions and related operations regarding which information, content, data, etc. is to be transmitted to mobile devices based on the various demographic, location, policy, social network, and communication network information, as will be described in greater detail hereafter. The main decision engine 310 performs its decision making operations based on classification, scoring, and policy results generated by the data classification engine 312, social network activity scoring engine 314, and policy engine 316. These engines operate on information obtained from the various information sources 320-328 and information obtained from the mobile devices 330-334.

Based on the results generated by the various engines 312-316, the main decision engine 310 selects information, content, or data (hereafter referred to as content data) to be transmitted to the corresponding mobile devices 330-334. The content data may be data files, applications, media files, or the like. The mobile devices 330-334 store the content data transmitted to them in a local storage device of the mobile devices 330-334. The content data may be made available to a user of the mobile devices 330-334 immediately, or may store the content data in a secure mode such that the content data cannot be accessed until a specific operation of the mobile device 330-334 is performed for accessing the particular content data. For example, the specific operation may be to scan a particular tag, barcode, or other physical identifier associated with the content data, e.g., a QR tag or barcode physically present on a product's packaging, a device, an advertisement, a sign, or the like. In one example, the content data may be stored in the mobile device 330-334 in a secure mode but when the user uses the camera of the mobile device 330-334 to scan a QR tag, the corresponding QR scanning application will detect an identifier of the content data that is to be retrieved by the QR scanning application, checks the local storage for the content data, and having already had the content data transmitted and stored in the mobile device 330-334, retrieves the content data from the local store rather than initiates retrieving the content data via the wireless network. In this way, the content data is retrieved more quickly and more quickly rendered on the mobile device 330-334.

As mentioned above, the main decision engine 310 utilizes the results generated by the analysis performed by the engines 312-316. The engines 312-316 operate on data obtained from the various information sources 320-328 and the mobile devices 330-334. The mobile network signal quality database 320 stores history information regarding signal quality of the mobile network at various geographical locations. The mobile network signal quality information may be gathered in any of a number of ways generally known in the art and thus, a more detailed explanation is not provided herein. This information may be used by the main decision engine 310 along with current location information obtained from the mobile devices 330-334 to determine whether the mobile device 330-334 is currently in, heading towards, destined for, or otherwise near an area of a wireless network where signal quality may be degraded or likely to make it difficult for a mobile device 330-334 user to access content data that is not remotely located at the mobile device 330-334. For example, if signal quality is sufficiently low, a user may not be able to access a data network via the wireless network at that location to obtain information as a result of scanning tags, surfing the Internet, or the like.

The user demographics and history database 322 stores demographic and possible history information pertaining to users of mobile devices and/or client computing devices, as well as demographic information of demographic groups, for use in determining demographic group associations. That is, various groups may be established based on similar demographics, e.g., users that are 55 or older, users that have an annual income level of $50,000.00 or more, users that have children, etc. Moreover, there may be demographic groups that combine more than one demographic, e.g., males that are 55 or older, females that have an annual income level of $50,000.00 or more, males that are 30 or older, have children, and earn at least $50,000.00 a year. Of course demographic groups may be defined for any combination of one or more demographics without departing from the spirit and scope of the illustrative embodiments.

The user demographics and history database 322 may store demographics for each of the users and may automatically update certain aspects of those demographics, such as age, for example, as necessary. The demographics may be initially input to the user demographics and history database 322 by the user or may be automatically collected from the user's registration of the user's mobile device, applications running on the user's mobile device, or any other mechanism for collecting demographic information about the user. This demographic information specifies various standardized characteristics of the various registered users including such characteristics as race, age, annual income, number of children, marital status, hobbies, as well as other various likes, dislikes, etc. Any demographic information for categorizing the user into various categories of characteristics and match those characteristics with other users or groups of users may be used without departing from the spirit and scope of the illustrative embodiments. This demographic information may be updated periodically in an automated manner similar to the initial collection of demographic information and/or may be updated manually by the user.

Alternatively, the user's demographic information may be stored locally in the user's mobile device 330 and portions of the demographic information that are pertinent to the particular context in which the mobile device is located, e.g., geographical location, particular event being attended, etc. may be transmitted to the main decision engine 310 periodically. What is meant by the particular context is the particular environment in which the user's mobile device 330 is presently located or the particular environment to which the user's mobile device 330 is predicted to be destined to reach based on the current trajectory of the user's mobile device 330. The context is defined by the current setting/environment of the user. Examples of contexts include "at workplace", "in classroom", "at home," etc. A user may exhibit different preferences at home versus at work, for example.

Based on the environment in which the user's mobile device 330 is located or to which the user's mobile device 330 is predicted to be destined to reach, the various content data that may be associated with those locations may be determined as well as the types of demographic information that may be of interest in matching this content data to users. Based on this information, it can be determined what demographic information is important to retrieve from the user's mobile device and as a result, that portion of the user's demographic information stored in the mobile device may be transmitted to the main decision engine 310.

The history information that may be stored in the user demographic and history database 322 may be any history information that is indicative of the types of content data the user has accessed or is likely to be interested in. This history information may be, for example, a history of the content data accessed by the user via their mobile device 330, a browsing history of an Internet browser application of the mobile device 330, locations where the user's mobile device 330 has been within a given period of time prior to the current period of time, and the like.

Social network applications/databases 324 provides applications for allowing users to interact with each other through a social networking protocol. For example, the social network applications may be applications for performing electronic mail communications, instant messaging communications, blogs, various types of web postings, voice over data communications, or the like. The social network applications/databases 324 may be local to the server 300 as shown or may be provided on one or more other computing devices that may be remotely located from server 300 and may be in communication with server 300 via one or more networks 340.

The social network applications/databases 324 stores information regarding social group associations of users as well as logs of communications exchanged between the users of the social groups. This information may be used by the social network activity scoring engine 314 and the main decision engine 310, along with information from the other information sources 320-328 and mobile devices 330-334, to determine what content data is most likely to be accessed by a user of a mobile device 330-334 and initiate a pre-fetch of this content data to the mobile device 330-334 based on such determinations.

For example, a user of the social network applications 324 may join a social group dedicated to fans of a particular television show, e.g., Star Trek™ or the like. The user registers with the social network application 324 by providing personal information, e.g., name, address, telephone number, etc., or otherwise uploading demographic information from the user's wireless device or initiating a transfer or lookup of this demographic information in the user demographics and history database 322, such as by logging onto server 300 and requesting to join the particular social group which may then initiate a process of retrieving or transferring the demographic information. The user may then interact with other users that are members of the same social group by exchanging communications such as electronic mail messages, instant messages, blog posts, newsgroup postings, voice messages, and the like. A log of these communications may be stored that includes, for example, identifiers of the users that submitted the communications, the content of the communications, and other metadata that may be useful in determining a nature of the communication. This log may be stored in the social network applications/databases 324 and/or stored in the mobile devices 330-334, for example. If stored in the mobile devices 330-334, the log may include only the communications to/from the user of the mobile device 330-334.

The log of these communications may be used to further filter what content data to pre-fetch and transmit to a mobile device 330-334, as described in greater detail hereafter. For example, a superset of content data may be identified by comparing demographic information of the user of a mobile device 330-334 with other users and/or established demographic groups. The content data that these other users have accessed or have shown an interest in may be identified and filtered according to the location or predicted location of the mobile device 330-334. This content data may further be filtered in accordance with the communication logs of the social network groups to which the user of the mobile device belongs and the expressed interests with regard to content data of the other users in the social network group as identified by the communication logs. The resulting content data selected through this series of filters and decision mechanisms may be transmitted to the mobile device 330-334 where it is stored, or cached, for quick retrieval should the user of the mobile device 330-334 attempt to access the content data.

The content data may be retrieved from the content data database 326 for transmission by the server 300 to the mobile device 330-334. The content data may be stored in the content data database 326 in response to the main decision engine 310 monitoring requests for content data sent by the various mobile devices 330-334. That is, content data that is either frequently requested or content data that is most recently requested may be stored in the content data database 326 as a cache of such content data since it is more likely that this content data may be requested by other users, or even the same user, in the near future. Any suitable criteria may be used to determine which content data to store in the content data database 326 without departing from the spirit and scope of the illustrative embodiments. The content data may be downloaded or otherwise retrieved from other content data sources, e.g., other servers or computing systems, via the one or more networks 340.

Alternatively, the content data stored in the content data database 326 may be only the content data of subscribers to the pre-fetching mechanisms of the illustrative embodiments. That is, sources of content data may subscribe to the content data pre-fetch mechanisms of the illustrative embodiments in order to have their content data made available for pre-fetch and transmission to mobile devices 330-334. This content data may be stored in the content data database 336 and retrieved and transmitted to mobile devices 330-334 when the conditions of the mobile device 330-334, the user's demographics, and the user's social network characteristics meet the requirements for retrieval and transmission of such content data for pre-fetch by the mobile device 330-334.

The content data tag and landmark database 328 stores identifiers of the tags/landmarks associated with various content data stored in the content data database 326. This information identifies what tags or other identifiers of content data are located at a particular geographical location or landmark. This information may be used along with a location of a mobile device 330-134, or predicted future location of the mobile device 330-334 based on a trajectory or route of the movement of the mobile device 330-334, to determine what tags or landmarks are present at this location or predicted location. These tags and landmarks may then be correlated with particular content data in the content data database 326 to identify a super-set of content data that may be of interest to the user of the mobile device 330-334. This super-set of content data may then be filtered down according to user demographics and social network group information obtained from the user demographics and history database 322 and social network applications/database 324.

On the operational engine side of the server 300, the data classification engine 312 performs the primary operations for identifying similar users (i.e. peers) or user groups (peer groups) to a user of a mobile device 330-334 based on the demographics of the user and the demographics of the other users or user groups using the information stored in the user demographics and history database 322. This determination of similarity may be a simple comparison of the demographics of the current user with demographics of other users or user groups and identifying those other users or user groups that have a predetermined number of demographic characteristics that match or match within a given tolerance, e.g., at least 3 demographic characteristics match within a 10% allowable difference.

This determination may be more complex and may involve looking at other criteria in addition to the demographic information to identify which users/groups of users are similar to the current user. For example, the data classification engine 312 may further look at recent activity of the current user, e.g., web browser application histories, recently visited geographical locations (as determined from location information of the mobile device 330, for example), or the like, to further determine which other users/groups of users are similar to the current user. For example, in one illustrative embodiment, the data classification engine 312 may determine the current web page(s) being accessed by a user of a mobile device 330 and determine a set of one or more users, or demographic groups, that have recently been associated with those web pages(s). This association may be the identification of other users that have accessed those same web page(s) or similar web page(s) having similar content, within a predetermined amount of time of the current time, for example. This information may be used along with the demographic comparisons mentioned above to identify a set of users/groups of users, having similar demographics and recent browser histories. Based on the identified similar users/groups of users, content data recently accessed by these other users/groups of users, or otherwise associated with these users/groups of users may be retrieved from the content data database 326 and transmitted to the mobile device 330 for caching.

In other illustrative embodiments, the data classification engine 312 may determine similarities between the current user of a mobile device 330 and other users/groups of users by using the demographic characteristic comparisons mentioned above in combination content data tag and landmark database 328 information identifying what tags/landmarks are located at or near the location or predicted future location of the mobile device 300. That is, the location/predicted future location of the mobile device 330 may be compared, by the data classification engine 312, to location information for tags/landmarks stored in the content data tag and landmark database 328 to identify a first super-set of content data that may be of interest to the user of the mobile device 330. This super-set of content data may then be further filtered according to the user's demographics and their similarity to other users/groups of users. That is, the demographic comparison described above may be used to identify users/groups of users having similar demographics to the current user. Based on the results of this comparison, the content data accessed or pre-fetched by these other users/groups of users, or otherwise associated with these other users/groups of users, may be identified and compared against the super-set of content data to be transmitted to the mobile device 330. This super-set of content data may then be filtered down to a sub-set of content data having content data from the super-set that has been accessed or pre-fetched by these other users/groups of users.

Other classifications of data and associations of users with other users/groups of users may likewise be performed based on demographic information, location information, tag/landmark information, and the like, without departing from the spirit and scope of the illustrative embodiments. In each embodiment, the associations between the user and other users/groups of users (e.g., demographic groups) may be stored in the user demographics and history database 322 along with a relative strength of these associations so that these associations may be used in future determinations of which users/groups of users the current user should be associated with. That is, as part of the classification performed by the data classification engine 312, the data classification engine 312 may identify associations already stored in the user demographics and history database 322 and their strengths to select those associations for consideration when determining what content data to pre-fetch and transmit to the mobile device 330. Moreover, the associations and their strengths may be used by the data classification engine 312 or the main decision engine 310 when too many content data items are returned for pre-fetch and transmission to the mobile device 330 such that content data items selected based on associations with higher relative strengths of association may be selected for pre-fetch and transmission over other content data items selected based on associations with relatively lower strengths of association. The strength of an association may be determined based on how often the association is selected for content data pre-fetch, how many of the content data items are actually accessed by the current user after pre-fetch, or the like. The strengths may be increased or weakened based on such criteria such that, for example, if the current user accesses a predetermined portion of the pre-fetched content data items within a predetermined period of time of the pre-fetch operation, then the strength of the association may be increased and if the current user does not access the predetermined portion of the pre-fetched content data items within the predetermined period of time of the pre-fetch operation, then the strength of the association may be decreased.

The social network activity scoring engine 314 operates on information obtained from the mobile device 330, user demographics and history database 322 and the social network applications/database 324 to score the associations of the current user of the mobile device 330 with peers in a social network group. For example, the social network activity scoring engine 314 may compare the demographic profiles of the current user and users in social network groups with which the current user is registered. The social network activity scoring engine 314 may further perform a location comparison to identify other users in the same social network groups as the current user (hereafter referred to as "peers") that have a same or similar location as the current user, within a given geographical tolerance. Moreover, the social network activity scoring engine 314 may perform communication analysis of communication logs to identify keywords corresponding to content data having tags/landmarks close to the current user's current or projected future location. All of these factors are used together along with scoring rules implemented by the social network activity scoring engine 314, to generate a score for each of the associations between the current user and peers in the social network group. Content data items accessed or otherwise associated with the peers having a sufficiently high score, as determined with regard to a pre-determined threshold or a relative measure against the other peers of the social network group, may be pre-fetched and transmitted to the mobile device 330.

The communication analysis may involve both a temporal filtering operation and a subject relevance filtering operation. That is, the communications in the social network group's communication logs may be filtered such that only communications that were made within a predetermined time period of the current time may be considered, e.g., within 3 hours prior to the current time. These communications may then be parsed to identify words and terms indicative of subject matter that may be of interest in determining content data to pre-fetch. For example, using the content data tag and landmark database 328, a list of keywords may be retrieved that describe content eligible for pre-fetching, e.g., content close to the user. The keywords are part of the content data tag and landmark database 328 and can be updated at any time by owners of the system or via user feedback. These keywords may then define the terms that are of interest for the purpose of identifying relevant social network activity.

Moreover, the content data, or metadata associated with the content data, that has been identified as being relevant to the current user's location, demographics, and the like, may be analyzed to identify relevant content words/terms. These two sets of words/terms may then be compared to identify which words/terms appear in both sets and thereby score the corresponding content data. The content data having words/terms that appear in communications of the social network group are scored relatively higher than content data that does not have corresponding words/terms that are used in the social network group's communications. These scores are indicative a strength of the user's association with the various peers in the social network group.

The policy engine 316 operates on established user policies in the user policy database 318 to determine when content data should be pre-fetched and transmitted to the mobile devices 330-334. That is, a user of a mobile device 330, for example, may establish a user policy that designates under what conditions content data should be pre-fetched and transmitted to the mobile device 330 and may also specify conditions under which such pre-fetching should not be performed. The policy engine 316 checks the current conditions of the mobile device 330, the networks(s) 340, and the like, to determine if these conditions are met and then informs the main decision engine 310 to implement the corresponding user policy. For example, a user may establish a policy that when the user's mobile device is in a geographical area where the signal quality is less than a predetermined threshold, content data pre-fetching should not be performed. Another policy may be that if the mobile device is predicted to be entering a geographical area where signal quality is going to be relatively low, the pre-fetching of content data for the predicted location is pre-fetched prior to entering the predicted geographical location. Other policies may specify a schedule for content data transmissions to the mobile device 330, e.g., a particular time of the day to transmit the content data, a particular time prior to entry into a geographical area of relatively low signal quality, and the Like.

The user policies may define the circumstances under which the final set of content is pre-fetched. For example, a user policy may be to "pre-fetch data only when connected to a wi-fi network" or "pre-fetch data when available bandwidth is at least 20 MBPS." Another example user policy may be to pre-fetch data only when the location of relevant content, e.g., pertaining to a landmark, is within 2 miles of the user's current location. The user policies may allow the user to influence device energy, service costs, etc., associated with pre-fetching.

The main decision engine 310 combines the determinations made by the data classification engine 312, the social network activity scoring engine 314, and the policy engine 316, to determine which, if any, of the content data items from the content data database 326 should be pre-fetched and transmitted to the mobile devices 330-334. Moreover, the main decision engine 310 may perform the necessary operations to perform the pre-fetching and transmission of the content data items selected using the mechanisms of the illustrative embodiments. Furthermore, as discussed above, the main decision engine 310 orchestrates the operation of the other elements of the server 300 and facilitates the communication between the server 300 and the mobile devices 330-334.

As discussed above, the mechanisms of the illustrative embodiments operate to select content data that may be pre-fetched and transmitted to mobile devices 330-334 so that this content data is cached in the mobile devices 330-334. In one illustrative embodiment, the content data may be stored in the mobile device 330-334 so that it may be accessed immediately by a user of the mobile device 330-334 simply by accessing the corresponding data files stored in the mobile device 330-334. Alternatively, a pre-requisite action may be required for the user to access the content data. This pre-requisite action may be a required interaction by the user with a particular application on the mobile device 330-334, an interaction between the mobile device 330-334 and the environment at which the mobile device 330-334 is located, or the like. For example, the content data may be accessed from the local storage of the mobile device 330-334 in response to a user using a browser application to attempt to retrieve the content data. The content data may be accessed from the local storage of the mobile device 330-334 in response to the user using the mobile device 330-334 to scan a QR tag, barcode, Microsoft tag, capturing an image using Google Goggles™, or otherwise obtaining an image from a "tag" or identification mechanism associated with a location, landmark, product, service, or the like.

Figure 4A:
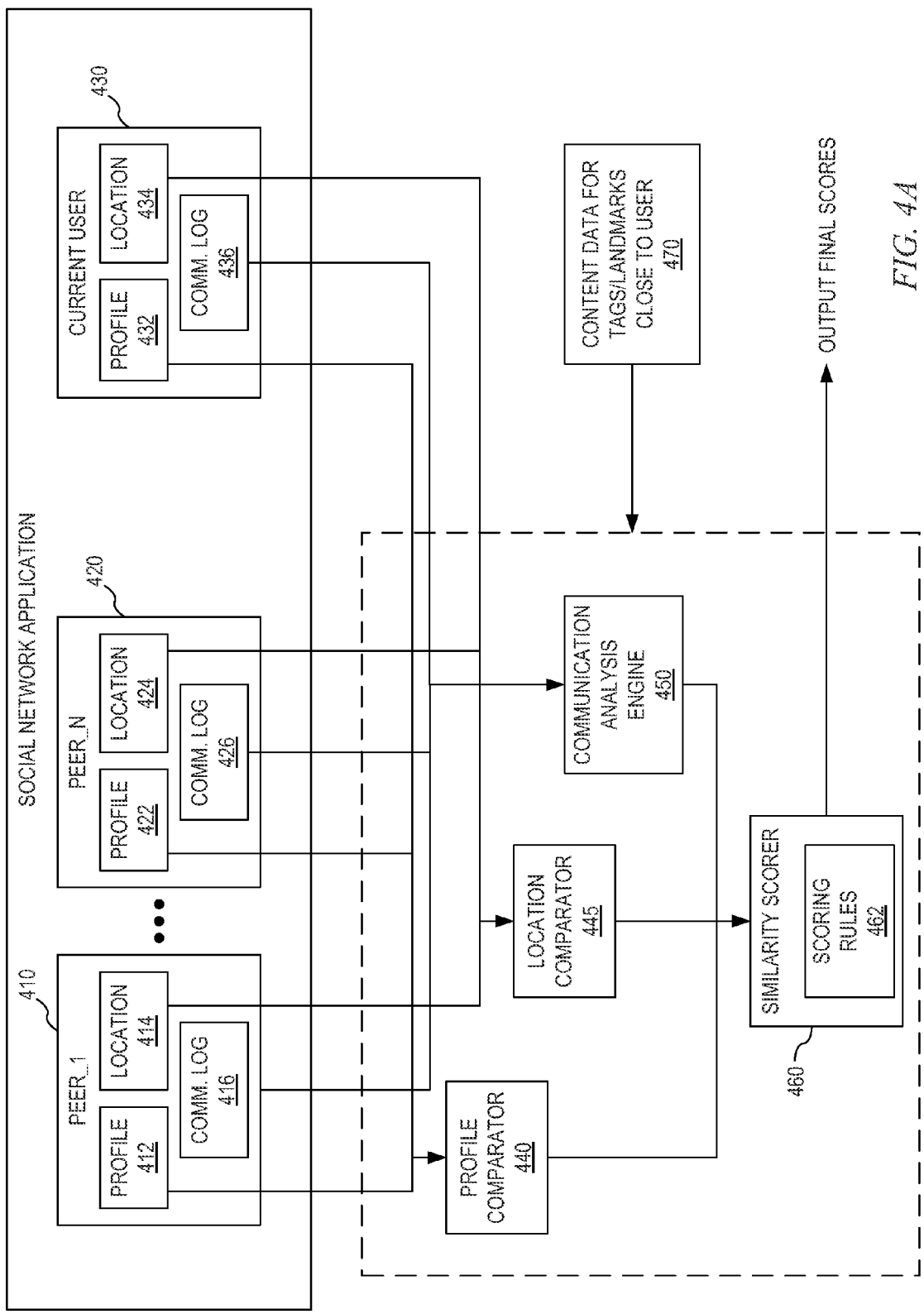
FIG. 4A is an example block diagram illustrating the primary operational elements for performing social network scoring operations in accordance with one illustrative embodiment.

As mentioned above, the social network activity scoring engine 314 scores the associations of a current user with his/her peers in the social network groups to which the current user belongs. FIG. 4A is an example block diagram illustrating the primary operational elements for performing social network scoring operations in accordance with one illustrative embodiment. As shown in FIG. 4A, each peer 410-430, including the current user 430, in a social network group has an associate demographic profile 412, 422, and 432. The demographic characteristics of the peers 410-430 may be compared by the social network activity scoring engine 314 via a demographic profile comparator 440 which generates a score with regard to each pairing of the current user 430 with the other peers 410-420 based on degree of matching between the current user's demographic characteristics and these other peers' demographic characteristics. Each matching demographic characteristic, which may be an exact match or a match within a predetermined tolerance, may increase the score of the association between the current user 430 and that peer 410-420.

Similarly, each peer 410-430, including the current user 430, has an associated current location 414, 424, and 434. In a similar manner as the profile comparison, the locations may be compared using location comparator 445 and scored such that peers located in a similar location as the current user 430 or in a similar location to a predicted future location of the current user 430, are scored higher than peers that are not.

Furthermore, each peer 410-430, including the current user 430, may have an associated communication log 416, 426, and 436 in the social network group which may be analyzed by the communication analysis engine 450 in the manner previously described above. The analysis of these communications may be based on the content data for tags/landmarks close to the current user 470 and the words/terms used in, or otherwise associated with (e.g., via metadata or the like) the content data. Again, scoring of these communications may be performed.

Separate scores are generated by each of the comparators 440-445 and the analysis engine 450 for each of the pairings between the current user 430 and the peers 410-420 in the social network group. These scores are input to a similarity scorer engine 460 which applies the scoring rules 462 to generate final scores for the associations of the current user 430 with the peers 410-420. These scoring rules 462 may specify, for example, particular functions, weightings, and the like, to apply to the input scores from the comparators 440-445 and analysis engine 450, to generate the output final scores. These output final scores are used by the main decision engine 310 to determine which content data to pre-fetch and transmit to the mobile devices 330-334.

Figure 4B:
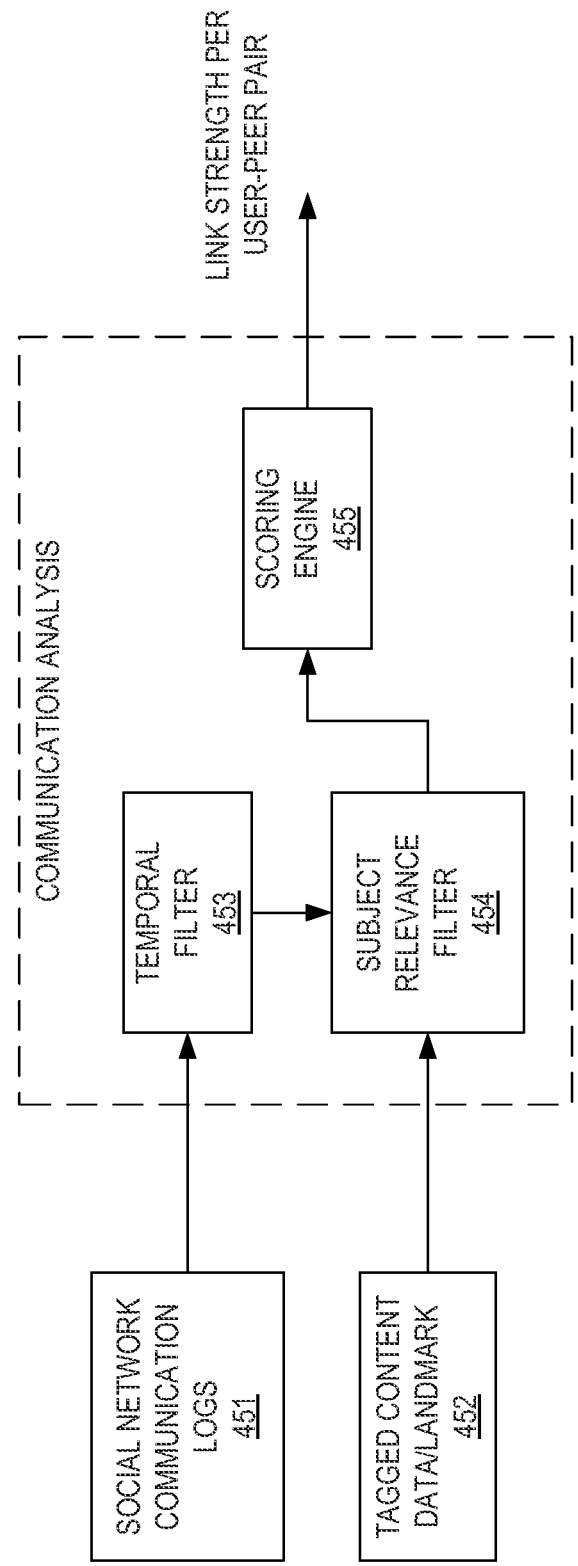
FIG. 4B is an example block diagram illustrating the primary operational elements for performing a social network communication link analysis in accordance with one illustrative embodiment.

FIG. 4B is an example block diagram illustrating the primary operational elements for performing a social network communication link analysis in accordance with one illustrative embodiment. As mentioned above, the communication analysis performed by the communication analysis engine 450 of the social network activity scoring engine 314 includes performing temporal and subject relevance filtering operations. As shown in FIG. 413, social network communication logs 451 are input to the temporal filter 453 of the communication analysis engine which then identifies communications in the communication logs that are within a predetermined time period of the current time. These communications are forward to the subject relevance filter 454 which also receives as input the tag/landmark content data 452 (and/or metadata associated with this tag/landmark content data). The subject relevance filter 454 may parse the communications to identify words/terms indicative of subject matter of these communications and may parse the content of the content data and/or the metadata of the content data to identify words/terms associated with the content data. These sets of words/terms may be compared and used to identify matching words/terms. The degree of matching may be used by the scoring engine 455 to generate final scores indicative of the strength of association between the current user and the peers in the social network group. These scores may be used with the other scores generated by the social network activity scoring engine 314 to determine a final scoring of the associations between the current user and the peers and ultimately select content data to be pre-fetched and transmitted to the mobile device 330-334.

Thus, the illustrative embodiments provide a mechanism for selecting content data to pre-fetch and transmit to a user's mobile device. The selection of the content data may be based on many factors including demographic information, location, history information, and the like. In particular, the selection of content data for pre-fetch may be based on social network group communications and content data accessed by peers of a current user in the various social network groups with which the current user is registered. In this way, content data that is mostly likely of interest to the current user based on the current user's location or predicted future location may be identified and pre-fetched such that it is stored in the user's mobile device for quicker retrieval.

Figure 5:
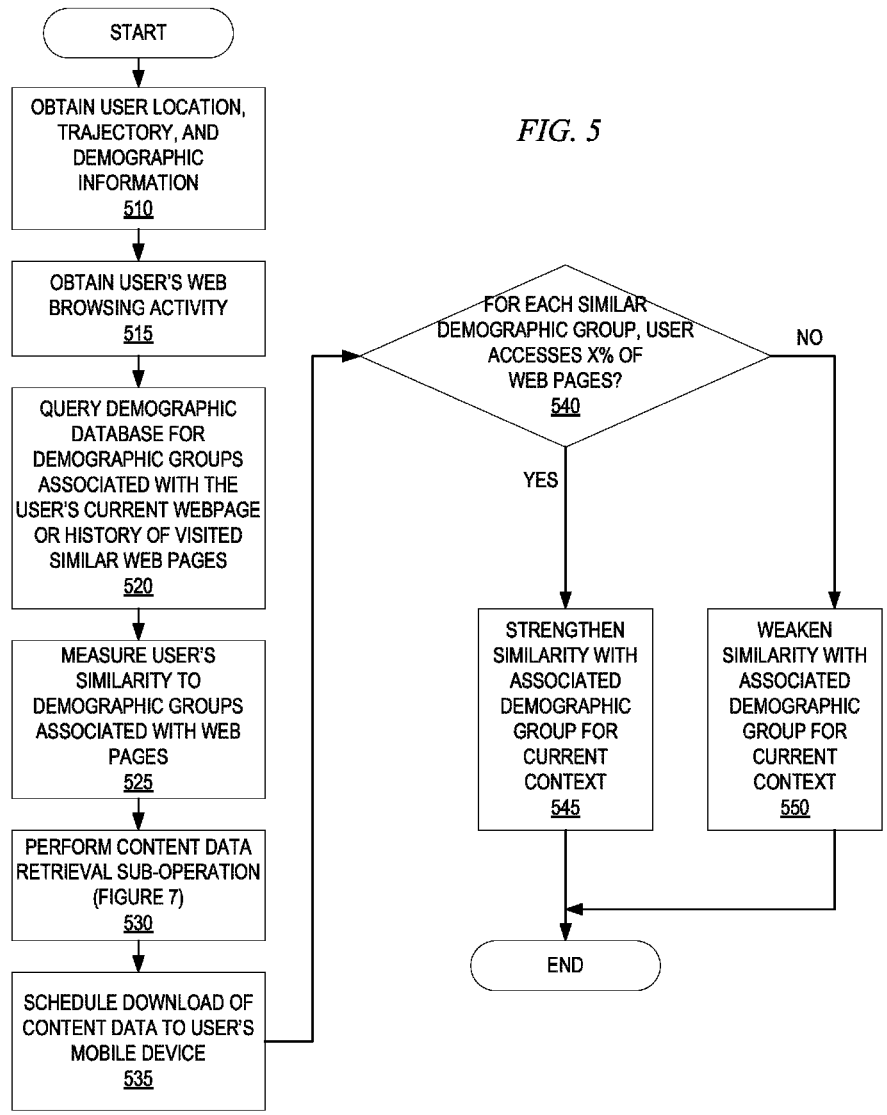
FIG. 5 is a flowchart outlining an example operation for performing demographic based pre-fetching of content data for web browsing activities in accordance with one illustrative embodiment.

FIG. 5 is a flowchart outlining an example operation for performing demographic based pre-fetching of content data for web browsing activities in accordance with one illustrative embodiment. The operation outlined in FIG. 5 may be performed, for example, by a server computing device. The operation is directed to pre-fetching content data based on the web browsing performed by the user of the mobile device so as to pre-fetch content data associated with web pages that the user is most likely to access based on the current context of the mobile device, e.g., current location, current usage, etc.

As shown in FIG. 5, the operation starts by receiving a user's location, trajectory, and context-based demographic information from the user's mobile device (step 510). The user's web browsing activities are also received from the mobile device (step 515). The server queries the demographic and history database for demographic groups associated with the user's current webpage or history of visited similar webpages, i.e. the demographics of the groups that the webpage or history of webpages are directed towards, e.g., age, education, income, etc. (step 520).

A similarity measurement is made between the user's demographics and the demographic groups associated with the current webpage and/or the history of visited similar webpages (step 525). This operation may be performed, for example, by using the user's context-based demographics and a cluster-based data classification algorithm to determine a similarity value for each of the demographic groups thereby identifying how closely the user's demographics match those of the demographic groups. Having generated a measure of the user's similarity to the various demographic groups associated with the current web page or history of visited similar web pages, a content data retrieval sub-operation is performed (step 530) as outlined in FIG. 7 hereafter. The result of this content data retrieval sub-operation is a set of one or more content data items associated with demographic groups whose similarity with the user's demographics exceeds a threshold value.

The download of the set of one or more content data items associated with the web pages to the user's mobile device is then scheduled (step 535). The scheduling may be performed, for example, based on the user's location, average speed, and amount of data to be transmitted and the user's policies regarding network usage. These factors may be considered so as to schedule the download, for example, such that the content data items are present in the user's mobile device prior to or at substantially a same time as the user reaches a location where the content data items may be accessed by the user. If the user is already present in the location where the content data items may be expected to be accessed, then the download may be scheduled for immediate download, for example.

A determination is made, for each similar demographic group, whether the user accesses at least a predetermined amount of the webpages associated with that similar demographic group over a period of time (step 540). If the user actually accesses at least a predetermined amount of the webpages associated with the similar demographic group, then the similarity measure between the user's demographics and the demographic group is increased for the current context (step 545). If the user does not actually access at least a predetermined amount of webpages associated with that similar demographic group over the period of time, then the similarity measure between the user's demographics and the demographic group is decreased for the current context (step 550). The operation then terminates.

Figure 6:
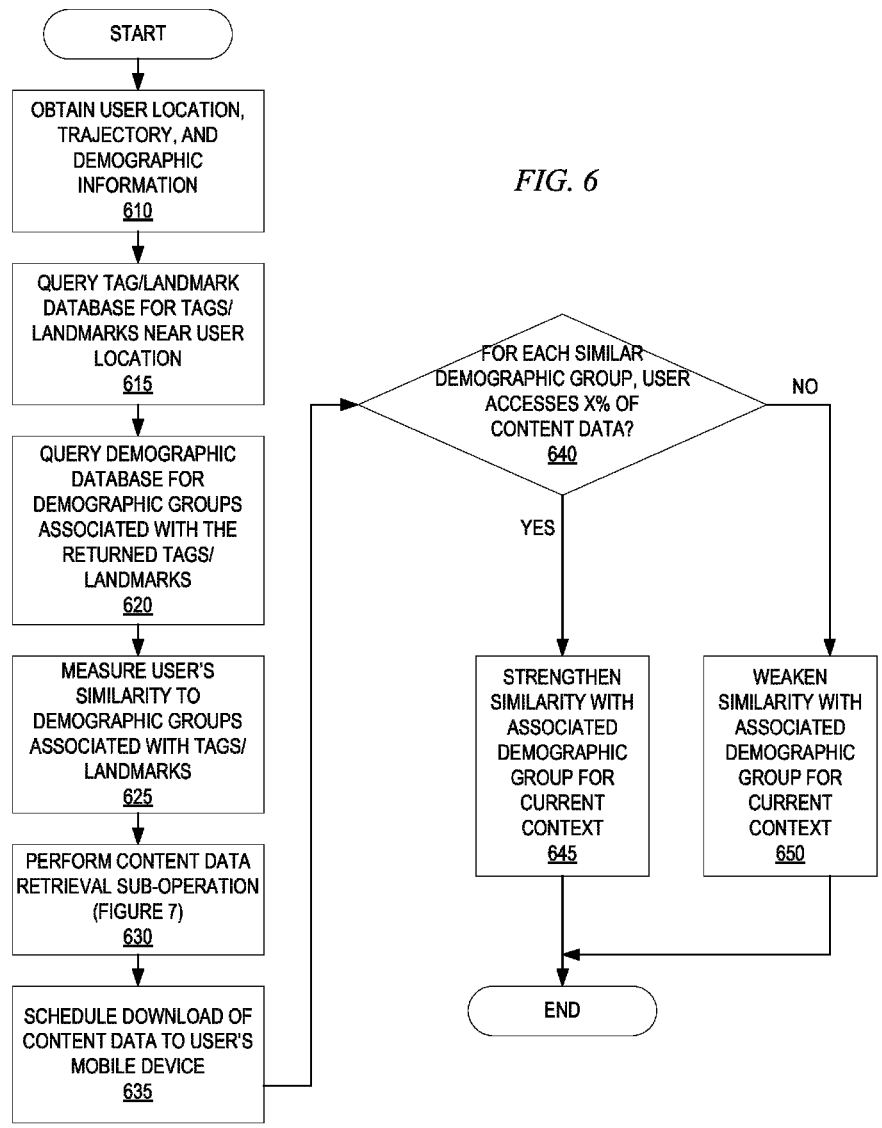
FIG. 6 is a flowchart outlining an example operation for performing demographic based pre-fetching of content data for tag scanning activities in accordance with one illustrative embodiment.

FIG. 6 is a flowchart outlining an example operation for performing demographic based pre-fetching of content data for tag scanning activities in accordance with one illustrative embodiment. The operation outlined in FIG. 6 may be performed, for example, by a server computing device. The operation is directed to pre-fetching content data based on the tag scanning performed by the user of the mobile device so as to pre-fetch content data associated with tags that the user is most likely to scan based on the current context of the mobile device.

As shown in FIG. 6, the operation starts by receiving a user's location, trajectory, and context-based demographic information from the user's mobile device (step 610). The server queries an advertisement and landmark tag database for tagged advertisements and/or landmarks near the user's location or soon to be near the user's location, as determined by the location of the user's mobile device (step 615). The server then queries the demographic and history database for demographic groups associated with the identified tagged advertisements and/or landmarks near (or soon to be near) the user's location (step 620).

A similarity measurement is made between the user's demographics and the demographic groups associated with the tagged advertisements and/or landmarks (step 625). As mentioned above, this operation may be performed, for example, by using the user's context-based demographics and a cluster-based data classification algorithm to determine a similarity value for each of the demographic groups thereby identifying how closely the user's demographics match those of the demographic groups. Having generated a measure of the user's similarity to the various demographic groups associated with the tagged advertisements/landmarks, a content data retrieval sub-operation is performed (step 630) as outlined in FIG. 7 hereafter. The result of this content data retrieval sub-operation is a set of one or more content data items associated with demographic groups whose similarity with the user's demographics exceeds a threshold value.

The download of the set of one or more content data items associated with the web pages to the user's mobile device is then scheduled (step 635). The scheduling may be performed, for example, based on the user's location, average speed, and amount of data to be transmitted and the user's policies regarding network usage. These factors may be considered so as to schedule the download, for example, such that the content data items are present in the user's mobile device prior to or at substantially a same time as the user reaches a location where the content data items may be accessed by the user. If the user is already present in the location where the content data items may be expected to be accessed, then the download may be scheduled for immediate download, for example.

A determination is made, for each similar demographic group, whether the user accesses at least a predetermined amount of the tagged advertisements/landmarks associated with that similar demographic group over a period of time (step 640). If the user actually accesses at least a predetermined amount of the tagged advertisements/landmarks associated with the similar demographic group, then the similarity measure between the user's demographics and the demographic group is increased for the current context (step 645). If the user does not actually access at least a predetermined amount of tagged advertisements/landmarks associated with that similar demographic group over the period of time, then the similarity measure between the user's demographics and the demographic group is decreased for the current context (step 650). The operation then terminates.

Figure 7:
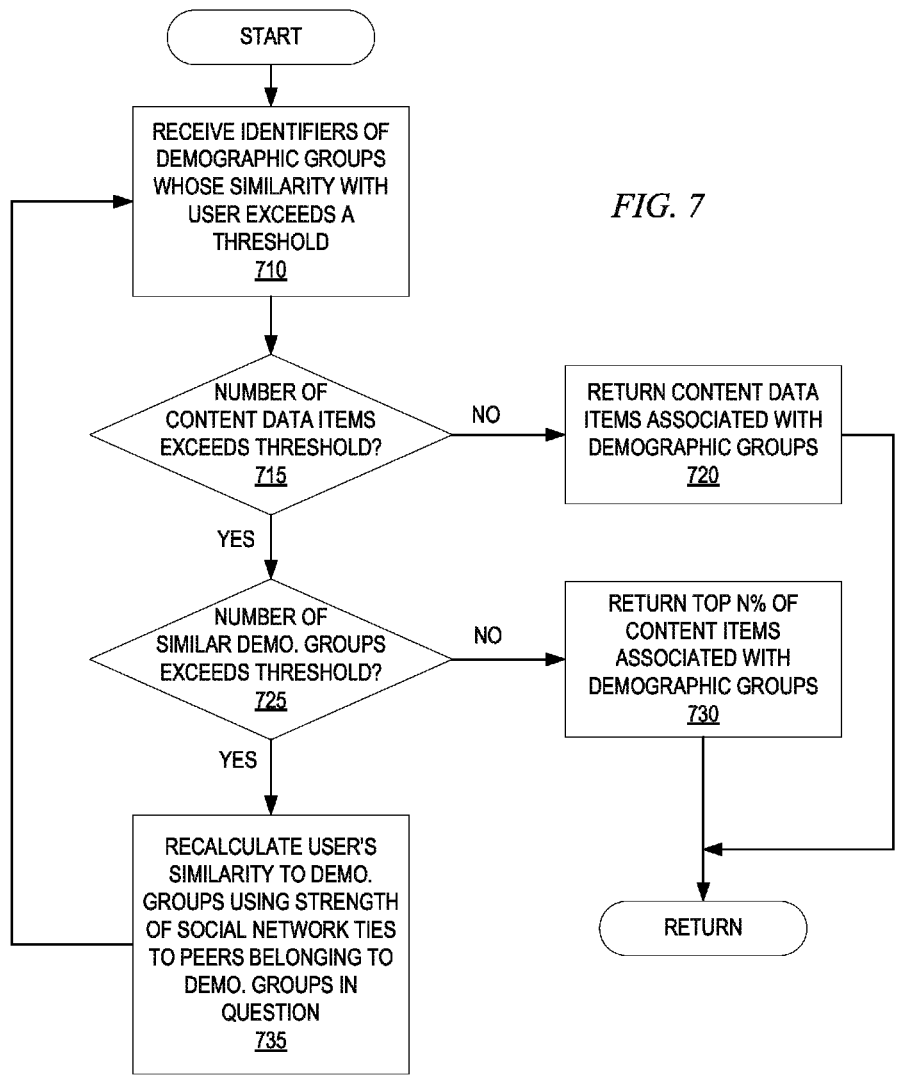
FIG. 7 is a flowchart outlining an example operation for selecting content data items associated with demographic groups that are similar to the demographics of the particular user to be transmitted to the user's mobile device as part of a pre-fetching operation in accordance with one illustrative embodiment.

FIG. 7 is a flowchart outlining an example operation for selecting content data items associated with demographic groups that are similar to the demographics of the particular user to be transmitted to the user's mobile device as part of a pre-fetching operation in accordance with one illustrative embodiment. The operation outlined in FIG. 7 may be performed, for example, as part of steps 530 and 630 in FIGS. 5 and 6.

As shown in FIG. 7, the operation starts by receiving identifiers of the demographic groups whose similarity with the user's demographics exceed a threshold (step 710). A determination is made as to whether a number of content data items, e.g., web pages or tag-associated content, associated with the demographic groups exceeds a threshold value (step 715). If not, then the content data items associated with the demographic groups are returned for scheduling of their transmission to the user's mobile device (step 720). If the number of content data items associated with demographic groups exceeds a threshold value, then a determination is made as to whether a number of similar demographic groups exceeds a threshold value (step 725). If not, then a predetermined portion of content data times associated with the similar demographic groups is selected to be returned for scheduling, e.g., the top n% of content data items associated with the demographic groups is returned for scheduling of transmission to the user's mobile device (step 730).

If the number of similar demographic groups exceeds a threshold value (step 725), then the user's similarity to demographic groups is recalculated using the strength of social network ties to peers belonging to the similar demographic groups in question (step 735). This recalculation may be performed by using social network analysis association measurement techniques as previously described above. The operation then returns to step 715.

Figure 8:
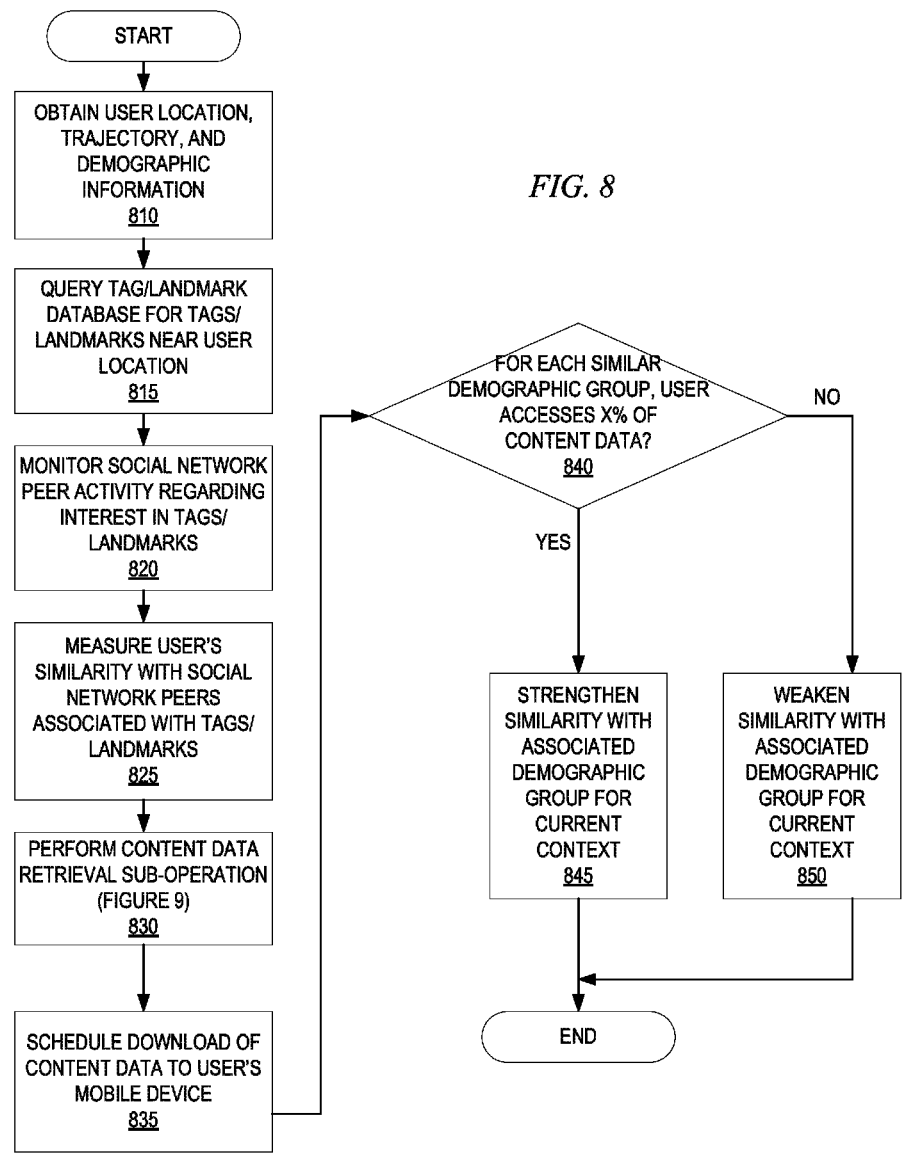
FIG. 8 is a flowchart outlining an example operation for performing demographic based pre-fetching of content data for tag scanning activities in which social networking factors are used as a basis for determining similarity of demographic groups in accordance with one illustrative embodiment.

FIG. 8 is a flowchart outlining an example operation for performing demographic based pre-fetching of content data for tag scanning activities in which social networking factors are used as a basis for determining similarity of demographic groups in accordance with one illustrative embodiment. The operation outlined in FIG. 8 may be performed, for example, by a server computing device. The operation is directed to pre-fetching content data based on the tag scanning performed by the user of the mobile device so as to pre-fetch content data associated with tags that the user is most likely to scan based on the current context of the mobile device. In this way, the operation in FIG. 8 is similar to that of FIG. 6, but with the additional mechanisms for determining similarities of demographic groups based on social network analysis mechanisms.

As shown in FIG. 8, the operation starts by receiving a user's location, trajectory, and context-based demographic information from the user's mobile device (step 810). The server queries an advertisement and landmark tag database for tagged advertisements and/or landmarks near the user's location or soon to be near the user's location, as determined by the location of the user's mobile device (step 815). The server then monitors the social networks with which the user is associated regarding the user's peers' communications regarding interests in the tagged advertisements/landmarks (step 820).

A similarity measurement is made between the user's demographics and the demographic groups associated with the tagged advertisements and/or landmarks (step 825). This operation may be performed, for example, by using the user's context-based demographics and a social network analysis algorithm that generates an output of similarity values associated with the various demographic groups. Having generated a measure of the user's similarity to the various demographic groups associated with the tagged advertisements/landmarks, a content data retrieval sub-operation is performed (step 830) as outlined in FIG. 9 hereafter. The result of this content data retrieval sub-operation is a set of one or more content data items associated with demographic groups whose similarity with the user's demographics exceeds a threshold value.

The download of the set of one or more content data items associated with the web pages to the user's mobile device is then scheduled (step 835). The scheduling may be performed, for example, based on the user's location, average speed, and amount of data to be transmitted and the user's policies regarding network usage. These factors may be considered so as to schedule the download, for example, such that the content data items are present in the user's mobile device prior to or at substantially a same time as the user reaches a location where the content data items may be accessed by the user. If the user is already present in the location where the content data items may be expected to be accessed, then the download may be scheduled for immediate download, for example.

A determination is made, for each similar demographic group, whether the user accesses at least a predetermined amount of the tagged advertisements/landmarks associated with that similar demographic group over a period of time (step 840). If the user actually accesses at least a predetermined amount of the tagged advertisements/landmarks associated with the similar demographic group, then the similarity measure between the user's demographics and the demographic group is increased for the current context (step 845). If the user does not actually access at least a predetermined amount of tagged advertisements/landmarks associated with that similar demographic group over the period of time, then the similarity measure between the user's demographics and the demographic group is decreased for the current context (step 850). The operation then terminates.

Figure 9:
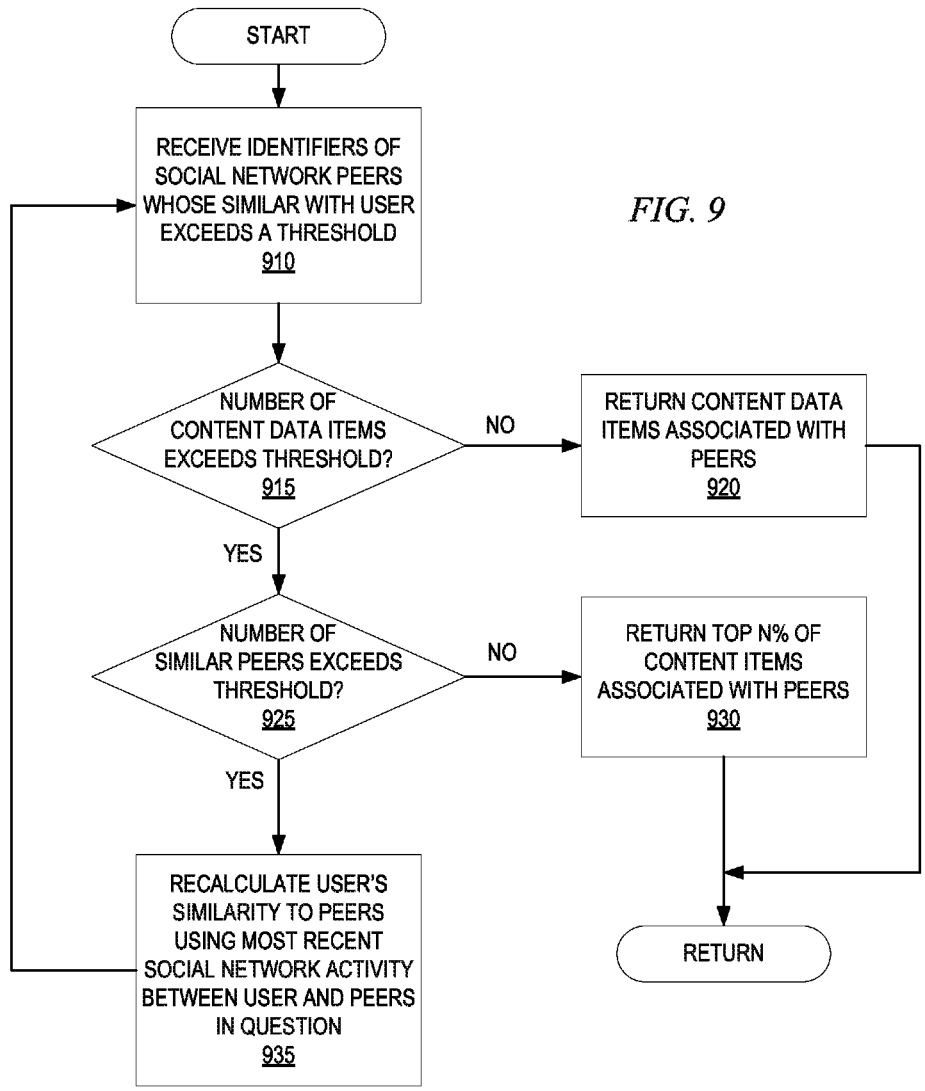
FIG. 9 is a flowchart outlining an example operation for selecting content data items associated with demographic groups that are similar to the demographics of the particular user to be transmitted to the user's mobile device as part of a pre-fetching operation in accordance with one illustrative embodiment.

FIG. 9 is a flowchart outlining an example operation for selecting content data items associated with demographic groups that are similar to the demographics of the particular user to be transmitted to the user's mobile device as part of a pre-fetching operation in accordance with one illustrative embodiment. The operation outlined in FIG. 9 may be performed, for example, as part of step 830 in FIG. 8.

As shown in FIG. 9, the operation starts by receiving identifiers of the social network peers whose similarity with the user exceeds a threshold (step 910). A determination is made as to whether a number of content data items, e.g., tag-associated content, associated with the social network peers exceed a threshold value (step 915). If not, then the content data items associated with the social network peers are returned for scheduling of their transmission to the user's mobile device (step 920). If the number of content data items associated with social network peers exceeds a threshold value, then a determination is made as to whether a number of similar social network peers exceeds a threshold value (step 925). If not, then a predetermined portion of content data times associated with the similar social network peers is selected to be returned for scheduling, e.g., the top n% of content data items associated with the social network peers is returned for scheduling of transmission to the user's mobile device (step 930).

If the number of similar social network peers exceeds a threshold value (step 925), then the user's similarity to the social network peers is recalculated using the most recent social network activity between the user and the social network peers (step 935). This recalculation may be performed by using social network analysis association measurement techniques. The operation then returns to step 915.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or 1/0 devices (including but not limited to keyboards, displays, pointing devices, etc.) can be coupled to the system either directly or through intervening 110 controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for pre-fetching content data and storing the content data in a mobile device, comprising:
   receiving, in the data processing system from the mobile device, an identifier of the mobile device and a location of the mobile device;
   obtaining, by the data processing system, demographic information about a user of the mobile device based on the identifier of the mobile device;
   comparing, by the data processing system, the demographic information of the user with demographic information of other users to identify one or more similar users having similar demographic information to the demographic information of the user of the mobile device;
   identifying, by the data processing system, content data to transmit to the mobile device based on the location of the mobile device and the identification of the one or more similar users, wherein identifying content data to transmit to the mobile device based on the location of the mobile device and the identification of the one or more similar users comprises:
      performing a lookup operation in a tag data and landmark database that stores content data in association with geographical location information to retrieve content data having an associated geographical location within a predetermined geographical range of the location of the mobile device to generate a superset of content data; and
      selecting a subset of the superset of content data based on content data accessed by the one or more similar users, wherein the one or more similar users are users of a same social network system or social network application as the user of the mobile device; and
   transmitting, by the data processing system, the content data to the mobile device for storage in the mobile device.

2. The method of claim 1, wherein identifying content data further comprises:
   identifying a social network system with which the user of the mobile device is associated;
   analyzing one or more communications between at least a subset of the one or more similar users that are determined to be in the social network system to identify content of interest to the one or more similar users that are determined to be in the social network system; and
   identifying the content data as content data corresponding to the identified content of interest of the one or more similar users.

3. The method of claim 2, wherein analyzing one or more communications between at least the subset of the one or more similar users comprises, for each of the one or more similar users:
   generating a score based on a similarity of demographic information between the similar user and the user of the mobile device, a similarity of the location of the mobile device with a location of the similar user, and a score of keywords in communications within the social network system associated with the similar user.

4. The method of claim 3, wherein the score of keywords in the communications within the social network system is generated based on at least one of a temporal filtering of the communications or subject relevance filtering of the communications.

5. The method of claim 1, wherein transmitting the content data to the mobile device for storage in the mobile device comprises comparing a current condition of the mobile device to one or more conditions specified in a user policy, wherein the user policy specifies user established conditions required for transmission of the content data, and wherein the content data is transmitted to the mobile device only in response to the conditions of the mobile device meeting the one or more conditions specified in the user policy.

6. The method of claim 1, wherein identifying content data to transmit to the mobile device based on the location of the mobile device comprises:
predicting a future destination of user based on a predicted path of motion of the user, the predicted path of motion being determined based on the location of the mobile device; and
identifying content data that corresponds to the future destination of the user.

7. The method of claim 1, wherein the content data is cached in a cache memory of the mobile device for access by a user of the mobile device at a later point in time.

8. The method of claim 7, wherein the content data is output to the user only in response to a specific operation being performed by the user with the mobile device.

9. The method of claim 8, wherein the specific operation is at least one of scanning a particular tag, barcode, or physical identifier at a physical geographical location associated with the content data.

10. The method of claim 1, further comprising:
obtaining wireless network signal strength information for a geographical area associated with the location of the mobile device or a predicted future location of the mobile device; and
determining whether the wireless network signal strength information for the geographical area is below a predetermined threshold, wherein transmitting the content data to the mobile device for storage in the mobile device is performed in response to a determination that the wireless network signal strength information for the geographical area is below the predetermined threshold.

11. The method of claim 1, further comprising:
retrieving a web browser history from the mobile device; and
analyzing the web browser history to identify interests of the user of the mobile device, wherein identifying content data to transmit to the mobile device based on the location of the mobile device and the identification of the one or more users is further based on the identified interests of the user of the mobile device identified by the analysis of the web browser history.

12. A computer program product comprising a non-transitory computer readable storage medium having a computer readable program stored therein, wherein the computer readable program, when executed on a computing device, causes the computing device to:
receive, from a mobile device, an identifier of the mobile device and a location of the mobile device;
obtain demographic information about a user of the mobile device based on the identifier of the mobile device;
compare the demographic information of the user with demographic information of other users to identify one or more similar users having similar demographic information to the demographic information of the user of the mobile device;
identify content data to transmit to the mobile device based on the location of the mobile device and the identification of the one or more similar users, wherein the computer readable program causes the computing device to identify content data to transmit to the mobile device based on the location of the mobile device and the identification of the one or more similar users by:
performing a lookup operation in a tag data and landmark database that stores content data in association with geographical location information to retrieve content data having an associated geographical location within a predetermined geographical range of the location of the mobile device to generate a superset of content data; and
selecting a subset of the superset of content data based on content data accessed by the one or more similar users, wherein the one or more similar users are users of a same social network system or social network application as the user of the mobile device; and
transmit the content data to the mobile device for storage in the mobile device.

13. The computer program product of claim 12, wherein the computer readable program causes the computing device to identify content data by:
identifying a social network system with which the user of the mobile device is associated;
analyzing one or more communications between at least a subset of the one or more similar users that are determined to be in the social network system to identify content of interest to the one or more similar users that are determined to be in the social network system; and
identifying the content data as content data corresponding to the identified content of interest of the one or more similar users.

14. The computer program product of claim 13, wherein the computer readable program causes the computing device to analyze one or more communications between at least the subset of the one or more similar users by, for each of the one or more similar users:
generating a score based on a similarity of demographic information between the similar user and the user of the mobile device, a similarity of the location of the mobile device with a location of the similar user, and a score of keywords in communications within the social network system associated with the similar user.

15. The computer program product of claim 14, wherein the score of keywords in the communications within the social network system is generated based on at least one of a temporal filtering of the communications or subject relevance filtering of the communications.

16. The computer program product of claim 12, wherein the computer readable program causes the computing device to transmitting the content data to the mobile device for storage in the mobile device by comparing a current condition of the mobile device to one or more conditions specified in a user policy, wherein the user policy specifies user established conditions required for transmission of the content data, and wherein the content data is transmitted to the mobile device only in response to the conditions of the mobile device meeting the one or more conditions specified in the user policy.

17. The computer program product of claim 12, wherein the computer readable program causes the computing device to identify content data to transmit to the mobile device based on the location of the mobile device by:
predicting a future destination of user based on a predicted path of motion of the user, the predicted path of motion being determined based on the location of the mobile device; and
identifying content data that corresponds to the future destination of the user.

18. The computer program product of claim 12, wherein the content data is cached in a cache memory of the mobile device for access by a user of the mobile device at a later point in time.

19. The computer program product of claim 18, wherein the content data is output to the user only in response to a specific operation being performed by the user with the mobile device.

20. The computer program product of claim 19, wherein the specific operation is at least one of scanning a particular tag, barcode, or physical identifier at a physical geographical location associated with the content data.

21. The computer program product of claim 12, wherein the computer readable program further causes the computing device to:
 obtain wireless network signal strength information for a geographical area associated with the location of the mobile device or a predicted future location of the mobile device; and
 determine whether the wireless network signal strength information for the geographical area is below a predetermined threshold, wherein transmitting the content data to the mobile device for storage in the mobile device is performed in response to a determination that the wireless network signal strength information for the geographical area is below the. predetermined threshold.

22. The computer program product of claim 12, wherein the computer readable program further causes the computing device to:
 retrieve a web browser history from the mobile device; and
 analyze the web browser history to identify interests of the user of the mobile device, wherein identifying content data to transmit to the mobile device based on the location of the mobile device and the identification of the one or more users is further based on the identified interests of the user of the mobile device identified by the analysis of the web browser history.

23. An apparatus, comprising:
a processor; and
a memory coupled to the processor, wherein the memory comprises instructions which, when executed by the processor, cause the processor to:
receive, from a mobile device, an identifier of the mobile device and a location of the mobile device;
obtain demographic information about a user of the mobile device based on the identifier of the mobile device;
compare the demographic information of the user with demographic information of other users to identify one or more similar users having similar demographic information to the demographic information of the user of the mobile device;
identify content data to transmit to the mobile device based on the location of the mobile device and the identification of the one or more similar users, wherein the instructions cause the processor to identify content data to transmit to the mobile device based on the location of the mobile device and the identification of the one or more similar users by:
 performing a lookup operation in a tag data and landmark database that stores content data in association with geographical location information to retrieve content data having an associated geographical location within a predetermined geographical range of the location of the mobile device to generate a superset of content data; and
 selecting a subset of the superset of content data based on content data accessed by the one or more similar users, wherein the one or more similar users are users of a same social network system or social network application as the user of the mobile device; and
transmit the content data to the mobile device for storage in the mobile device.

* * * * *